United States Patent [19]

Kim

[11] Patent Number: 4,879,626
[45] Date of Patent: Nov. 7, 1989

[54] OVERLOAD RELAY WITH ADJUSTABLE THRESHOLD INDICATOR

[76] Inventor: In S. Kim, Samig Apt. 10-dong 615, 134-21, Cheongdam-dong, Kangnam-ku, Seoul, Rep. of Korea

[21] Appl. No.: 256,138

[22] Filed: Oct. 7, 1988

Related U.S. Application Data

[63] Continuation of Ser. No. 157,139, Feb. 10, 1988, abandoned, which is a continuation of Ser. No. 770,094, Aug. 28, 1985, abandoned.

[30] Foreign Application Priority Data

Sep. 1, 1984 [KR] Rep. of Korea .................... 84-5375
May 2, 1985 [KR] Rep. of Korea .................... 85-2996
May 2, 1985 [KR] Rep. of Korea .................... 85-2997

[51] Int. Cl.$^4$ ............................................. H02H 3/093
[52] U.S. Cl. ........................................ 361/93; 361/96; 340/662
[58] Field of Search ................................ 361/93-95, 361/98, 100, 101, 106, 89; 340/641, 662, 664

[56] References Cited

U.S. PATENT DOCUMENTS

| | | | |
|---|---|---|---|
| 4,034,269 | 7/1977 | Wilkinson | 361/89 X |
| 4,075,674 | 2/1978 | Squiers et al. | 361/106 X |
| 4,277,811 | 7/1981 | Sato | 361/101 |
| 4,345,292 | 8/1982 | Jaeschke et al. | 361/94 |
| 4,414,601 | 11/1983 | Conroy, Jr. | 361/94 X |

Primary Examiner—Todd E. Deboer
Attorney, Agent, or Firm—Cushman, Darby & Cushman

[57] ABSTRACT

The present invention relates to an electronic overload relay which uses a schmidt trigger circuit or a CMOS integrated circuit, wherein the electronic overload relay includes an automatic return circuit connected in parallel between the output terminal of a NOT-gate and the input terminal of a succeeding NOT-gate, an instaneous operation characteristic circuit connected in series between one terminal of a variable resistance and the input terminal of the succeeding NOT-gate, and a temperature compensation circuit connected in parallel to the secondary coil of the current transformer.

2 Claims, 2 Drawing Sheets

OVERLOAD RELAY WITH ADJUSTABLE THRESHOLD INDICATOR

This is a continutation of application Ser. No. 157,139, filed Feb. 10, 1988, now abandoned, which is a continuation of application Ser. No. 770,094, filed Aug. 28, 1985, now abandoned.

BACKGROUND OF THE INVENTION

The present invention relates to an electronic overload relay which uses a Schmitt trigger circuit or CMOS integrated circuit.

The present invention is designed to improve and supplement the system disclosed in Korean patent application Ser. No. 84-5375, filed on Sept. 1, 1984 by the present inventor.

The conventional thermal relay and induction overload relay, which use a bimetal as an AC overload relay, have defects in that they are not precise in their operation, are varied and big in their sizes, and are highly priced. Therefore, electronic overload relays have been recently invented, but these relays also have defects because they are of varying types very difficult and complicated to adjust the current and the timing thereof, big in size and highly priced.

SUMMARY OF THE INVENTION

In view of the above-mentioned defects of the prior art, the present invention comprises an overload circuit which uses a CMOS IC or a Schmitt trigger circuit. The present invention is thus simple in its construction and accuracy of operation. It is also possible to adjust the current by confirming the situation of operation with the usage of a lamp for displaying the situation of operation.

Other features and advantages of the invention will be apparent from the following description of the preferred embodiment taken in conjunction with the accompanying drawings.

DESCRIPTION OF THE PREFERRED EMBODIMENTS

Figure 1:
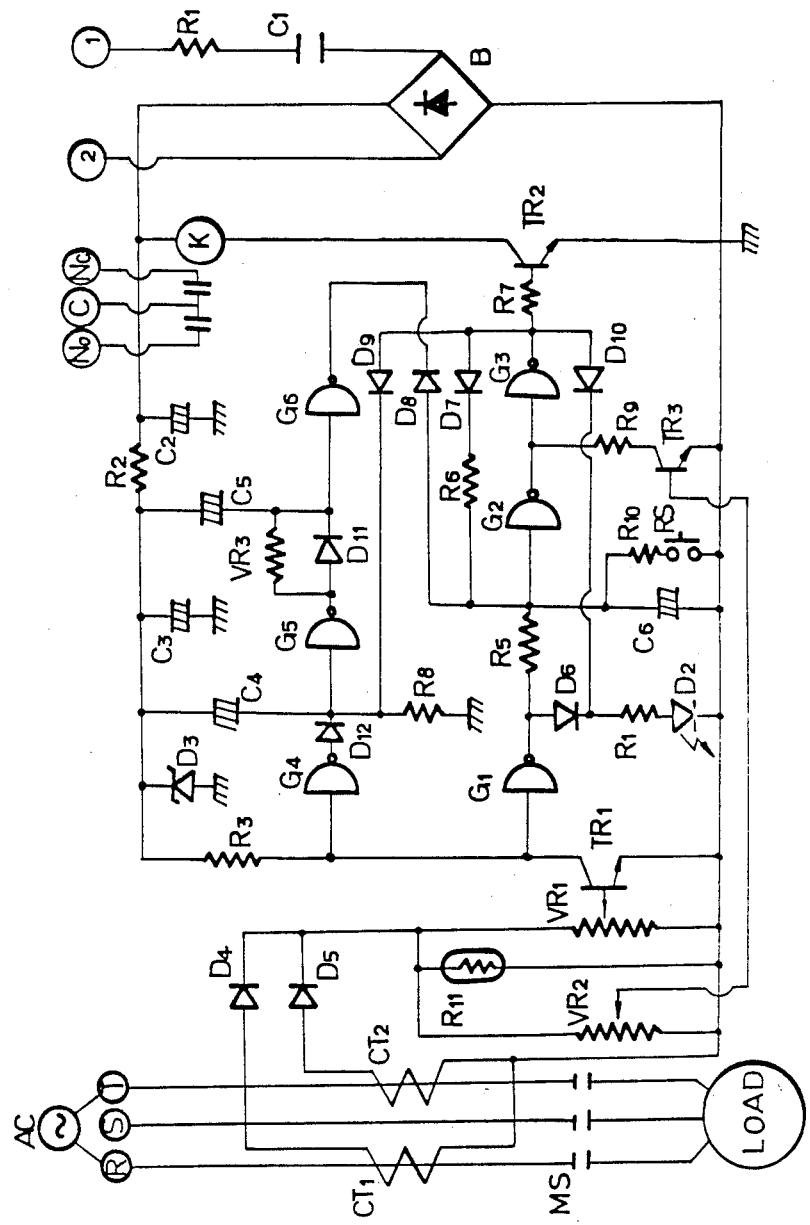
FIG. 1 is a circuit drawing of the first embodiment of the present invention.

In FIG. 1, reference characters R, S and T indicate a three phase electric AC power source; CT1, CT2 designate a cylindrical current transformer; MS denotes a magnetic switch; LOAD represents an AC load; D4, D5 indicate diodes for preventing mutual feedback interference; R11 designates a thermistor for compensating for temperature; VR2 denotes a resistance for establishing an instantaneous current; G1–G6 represent NOT gates (the Schmitt trigger circuit or CMOS integrated circuit); B indicates a bridge circuit; C1–C6 each designates a condenser; VR1, VR3 each represent a variable resistor; and K denotes a relay.

The overload relay in accordance with the first embodiment of this invention comprises:

a rectification circuit (D4), (D5) connected with the output terminal of the current transformer (CT1), (CT2);

an amplifier (TR1) which amplifies the weak output signal produced by the rectification circuit (D4), (D5);

a temperature compensation circuit (VR2), (R11), (VR1) connected in parallel with the secondary coils of the current transformer (CT1), (CT2);

an overload display circuit (D6), (R1), (D2) connected in series between the output terminal of the NOT gate (G1) and a reference potential, such as ground;

an overload operation circuit (G1), (R5), (G2), (G3), (R7) connected in series between the collector terminal of the amplifier (TR1) and the base terminal of transistor (TR2);

a reset circuit (C6), (R10), (RS) connected in parallel between the input terminal of the NOT gate (G2) and ground;

an operation delay circuit (G4), (D12), (G5), (D11), (G6), (D8) connected in series between the collector terminal of the amplifier (TR1) and the input terminal of the NOT gate (G2);

a constant voltage circuit (C2), (R2), (C3), (C4), (D3) connected in series with the DC terminal of bridge circuit (B);

an operation power supply circuit (R1), (C1), (B);

and a DC relay (K) connected in series between the both DC terminals of the bridge circuit (B).

The overload relay in accordance with the second embodiment of this invention comprises:

a half-wave rectification circuit (D3), (D13), (D4) connected with the output terminal of current transmitter (CT1), (CT2), (CT3);

an amplifier (TR1) which amplifies the weak signal produced by the half-wave rectification circuit (D3), (D13), (D4);

an overload display circuit (D6), (R3), (R2) which displays the overload state by supplying through the NOT gate (G1), the pulse voltage amplified by the amplifier (TR1);

an overload cut-off state maintenance circuit (D10), (D5) which maintains the overload cut-off state by feed back of the output of integrating circuit (VR2), (D9), (C6);

an integrating circuit (VR2), (D9), (C6) for operating the overload;

a reset circuit (R6), (R7), (C6), (TR2), (RS) connected in parallel between the input terminal of the NOT-gate (G2) and the ground;

a minus multiplying voltage rectification circuit (R4), (R5), (C4), (D7), (D8);

an automatic return circuit (VR3), (D12), (C7) connected in parallel between the output terminal of the NOT gate (G2) and the input terminal of the NOT gate (G3);

an instantaneous operation characteristic circuit (R14), (TR4), (R13), (VR4), (R16), (R17) connected in series between one terminal of the variable resistance (VR1) and the input terminal of the NOT gate (G3);

a temperature compensation circuit (R9), (R12), (VR1) connected in parallel with the secondary coil of the current transmitter (CT1), (CT2), (CT3);

a constant voltage circuit (C2), (R1), (C3), (D11), connected in series in accordance with the DC terminal of bridge circuit (B);

an operation power supply circuit (R15), (C1), (B);

and a DC relay connected in series between both DC terminals of the bridge circuit (B).

The operation in accordance with the first embodiment of this invention will be explained as follows by referring to FIG. 1.

When the power source, namely, a single phase alternating current is supplied to the input terminal (1), (2) of the power supply source, the single phase alternating current is rectified by the bridge circuit (B), and then it is filtered by the smoothing circuit comprising the condensers (C2), (C3) and the resistance (R2). Thereafter the signal filtered by the smoothing circuit is respectively supplied to the input terminals of the NOT gates (G1) and (G4) through the zener diode (D3) and the resistance (R3).

On the other hand, and overcurrent detected by the current transformers (CT1) and (CT2) is rectified by the diodes (D4) and (D5) which prevent a mutual feedback interference, and is then supplied to the variable resistance (VR1) for adjusting the current in proportion to the voltage of the half wave output of the diodes. When the signal voltage produced at the variable terminal of the variable resistance (VR1) rises above the base terminal voltage of transistor (TR1), the transistor (TR1) is turned-on so that the input terminal of NOT gates (G1) and (G4) may produce the low signal of a rectangular wave. Simultaneously, the high signal produced by the output terminal of NOT gate (G1) is supplied to the light emitting diode (D2) by way of the diode (D6) and the resistance (R1). When a part of the high signal inverted by the NOT gate (G1) also supplied to the input terminal of NOT gate (G2) according to the time constant formed by the time constant circuit comprising the resistance (R5) and the condenser (C6), the output of NOT gate (G2) become low and the output of the NOT gate (G3) becomes high. Therefore, the transistor (TR2) is turned-on through the resistance (R7). When the transistor (TR2) is turned-on, the DC relay (K) starts to operate so that the support contacts of relay (K) are opened and closed.

When the DC relay (K) is turned on, the high signal produced by the output terminal of NOT gate (G3) is fed back to the input terminal of NOT gate (G2) by way of the diode (D7) and the resistance (R6) and also is supplied to the light emitting diode (D2) through the diode (D10) and the resistance (R1), so that the DC relay (K) is turned on continuously and the light emitting diode (D2) is energized. When the condenser (C6) is discharged by pushing the reset button (RS) by way of the resistance (R10) or when the input terminal of power source (1) (2) is turned-off momentarily, the reset switch (RS) is turned-off to the reset state automatically.

The explanation so far has been given as to the operation of the normal state. However, at the time of running of the load or change of the line, a running current or transient current which is several times more than that of the above-mentioned current will flow in the load. Since the usage of the circuits would only bring continuously the operating state of overload at running time, it is necessary to delay the operating state of the overload.

The delay circuit operates as follows:

The high signal produced from the output terminal of NOT gate (G4) is supplied to the input terminal of NOT gate (G5) by way of the diode (D12), so that it produces a low signal at the output terminal of NOT gate (G5).

In the course of a normal state operation, because the input terminal of NOT gate (G6) maintains its high signal with the condenser (C5), the low signal produced by the output terminal of NOT gate (G6) is bypassed by way of the diode (D8) so that the operation state of the overload may be delayed and the light emitting diode (D2) may be energized on.

On the other hand, when the output terminal of NOT-gate (G5) produces a low signal, the condenser (C5) is slowly discharged through the variable resistance (VR3) for correcting the delay time so that a low signal is supplied to the input terminal of Not-gate (G6) and then the high signal produced from the output terminal of NOT gate (G6) is supplied to the diode (D8). Therefore, the above-mentioned bypassing operation of diode (D8) stops and the operating of overload starts immediately.

In the FIG. 1, embodiment diode (D9) provides a feedback the signal produced from the output terminal of Not-gate (G3) to the input terminal of Not-gate (G5), the blocking diode (D12) isolates the low signal produced from the output terminal of NOT-gate (G4) from the high signal fed back through diode (D9). Resistor (R8) enables the fed back high signal to be held high.

The (R11) connected in parallel with the variable resistance (VR1) compensates the error caused by the change of the external temperature, and a variable resistance (VR2) turns on the transistor (TR3) when the overcurrent signal produced from the tap terminal located in the middle point of variable resistance (VR2) is supplied to the base terminal of the transistor (TR3).

The low signal produced at the collector terminal of the transistor (TR3) is supplied to the input terminal of NOT gate (G3) by way of the resistance (R9) so that the output terminal of the NOT gate (G3) produces a high signal. Therefore, the transistor (TR2) is turned-on and then the relay (K) is energized. Therefore, protection of overload may be achieved.

Figure 2:
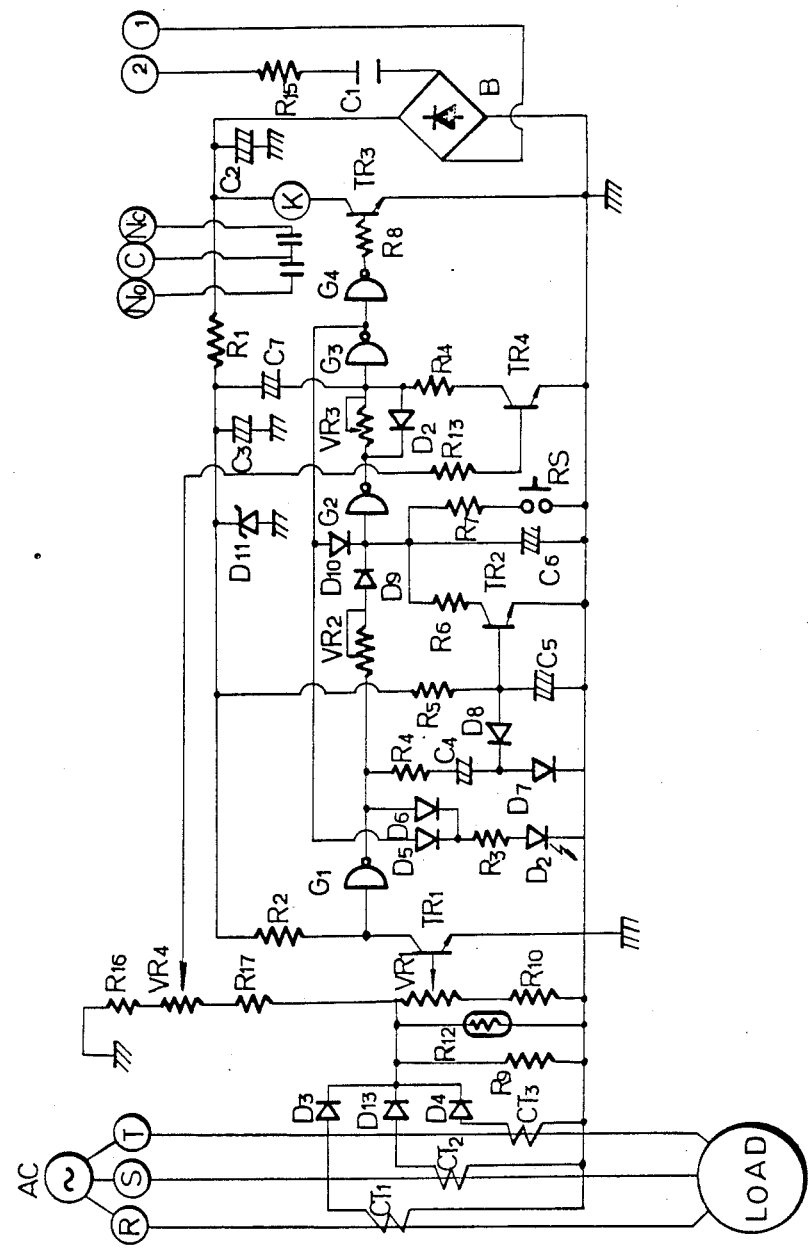
FIG. 2 is a circuit drawing of the second embodiment of the present invention.

The operation in accordance with the second embodiment of this invention will be explained as follows by referring to FIG. 2.

A single phase alternating current is supplied to the input terminals (1), (2) and rectified and filtered as in the first embodiment. The current detected by the current transformer (CT1), (CT2), (CT3) is rectified by the diodes (D3), (D13), (D4) so that it may be supplied respectively to the resistance (R9), the thermistor (R12) which compensates for temperature variations, the variable resistance (VR1) and the resistance (R10). The weak current rectified by the diode (D3), (D13), (D4) is amplified by the transistor (TR1) so that it may be supplied to the input terminal of the NOT gate (G1). Therefore, the output terminal of NOT gate (G1) produces a high signal which displays an overcurrent state through the diode (D6), the resistor (R3) and the light emitting diode (D2).

On the other hand, a portion of the output of the NOT gate (G1) is charged in the condenser (C6) through the variable resistance (VR2) which corrects the changing time and the blocking diode (D9). The charging speed in the condenser (C6) varies according to the time constant formed by the variable resistance (VR2) and the condenser (C6) and the magnitude of current overload. When the voltage charge across the condenser (C6) is more than half that of the power source of the NOT gate (G2), the input state of the NOT gate (G2) changes from low to high, and therefore the output state of the NOT gate (G2) changes from high to low. Thereafter the high signal produced by the NOT gate (G2) is supplied to the base terminal of transistor (TR3) through the variable resistance (VR3), the NOT gate (G3), the NOT-gate (G4) and resistor R8 so that the transistor (TR3) turned-off and the relay (K) may be turned-off.

The diode (D10) feeds back the high signal produced at the output terminal of the NOT gate (G3) to the input terminal of the NOT gate (G2) so that it is maintained in an operation state of overload because of continuously sustaining a high state of the input terminal of the NOT gate (G2) even in the absence of a signal at the output terminal of the NOT gate (G1). On the other hand, the operation state of overload is displayed because the high signal produced at the output terminal of the NOT gate (G3) is supplied to the light emitting diode (D2) by way of the diode (D5) and the resistance (R3).

When the reset switch (RS) is so pushed that the charge voltage in the condenser (C6) may be discharged, a low signal is supplied to the input terminal of the NOT gate (G2) via resistor R7. Therefore, a high signal is produced at the output terminal of the NOT gate (G2). When the high signal produced by the output terminal of the NOT gate (G2) is supplied to the base terminal of said transistor (TR3) by way of the NOT gates (G3) (G4), the transistor (TR3) is turned-on and then the relay (K) is turned on. Therefore, the operation state of the overload is returned to the state prior to the overload state.

In the case of the normal state operation without an overload signal, a low signal is produced at the output terminal of the NOT gate (G1) and the pulse voltage coupled to the resistance (R5) and the condenser (C5) is supplied to the base terminal of said transistor (TR2). Therefore, the transistor is turned-on and the charge voltage in the condenser (C6) is discharged through the resistance.

On the other hand, when the output terminal of the NOT gate (G1) produces a high signal, a minus multiplying voltage is supplied to the base terminal of transistor (TR2) through the minus multiplying voltage rectification circuit comprising the resistance (R4), the condenser (C4) and the diodes (D7) and (D8), so that transistor (TR2) is turned on. Therefore the above-mentioned discharge operation of the condenser (C6) stops, and then the overload operation starts. However, if the overload signal appears intermittently, the charge and discharge operation in the condenser (C6) is repeated so that an accumulation of signal in the condenser (C6) may be prevented. Therefore, the present invention prevents a error caused by the pulsating state of the load. Also the present invention will become an automatically returning overload relay when the charge and discharge circuit comprising the diode (D12) and the condenser (C7) is used instead of removing the feedback diode (D10).

The operation of the automatically returning overload relay will be explained as follows:

When the charge voltage in the condenser (C6) rises to more than $\frac{1}{2}$ of the input power source of the NOT gate (G2), the output of the NOT gate (G2) becomes low instantly and the input of the NOT gate (G3), which maintains the high state with condenser (C7), is instantly discharged through the diode (D12) so that the high signal changes the low signal. The high signal produced from the output terminal of the NOT gate (G3) is so supplied to the base terminal of the transistor (TR3) by way of the NOT gate (G4) and the resistance (R8) so that transistor (TR3) may be turned-off, and then the relay (K) is turned-off. In the event of removing the feedback diode (D10), the output of said NOT gate (G1) maintains a low signal because there is no input signal at the overload, so that the charge voltage on the condenser (C6) is immediately discharged through the transistor (TR2). Simultaneously, the input of the NOT gate (G2) becomes low and, its output high. Then the high signal produced at the output terminal of the NOT gate (G2) charges slowly across the condenser (C7) through the variable resistance (VR3) for controlling the return time. When the charge voltage in the condenser (C7) is more than $\frac{1}{2}$ of the voltage of the power source of the NOT gate (G3), the output of the NOT gate (G3) becomes low and the output (G4) of the NOT gate (G4) becomes a high. Therefore, the transistor (TR3) is turned-on, and then the relay (K) is turned on. Namely, the return time varies according to the time constant formed by the variable resistance (VR3) and the condenser (C7). When the automatically returning overload circuit is used in the metering outfit of each demand housing, it will become an accurate load limiter and also can be used as a substitute for the previous maximum demand matter meter. Therefore, the supply of power will be achieved smoothly.

An accident which is caused by the short circuit of the power transmission/transformer line is also prevented by means of the instantaneous operating circuit comprising the variable resistance (VR4), the resistors (R13), (R14), (R16), (R17) and the transistor (TR4).

If an accident occurs due to the short circuit on the line, the strong pulse voltage produced in the secondary coil of the current transformer (CT1), (CT2), (CT3) is supplied to the base terminal of the transistor (TR4) in accordance with the value set by the variable resistance (VR4), so that the transistor (TR4) is turned on. Therefore, the input of the NOT gate (G3) becomes low and, its output high. When the output of the NOT gate (G4) becomes low, the transistor (TR3) is turned-on. Therefore, the overload relay starts its operation.

The overload relay in accordance with the foregoing embodiment of the present invention has the following effect.

1. It is small in size and compact;
2. It is possible to make a correction of the current of the actual load (up to 100%) by looking at the display lamp;
3. As there is no accumulation of overload signal in the condenser, the error caused by the frequently running state of the load or the pulsation state of the load does not occur;
4. The price is cheap because of the new design;
5. The electronic relay of the present invention may be widely used from a tenth horsepower of the load up to a thousand horsepower;
6. The electronic relay of the present invention is not effected by an ambient temperature;
7. and electric consumption is minor.

It will be apparent that many modifications and variations may be effected without departing from the scope of the novel concepts of this invention as defined by the following claims.

What we claim is:

1. An overload relay circuit for a single phase or a three phase alternating current, said overload relay circuit receiving a constant DC voltage from a power supply circuit having two DC terminals and comprising:

a relay connected between said DC terminals of said power supply circuit;
   a current transformer having a secondary coil with an output terminal, said current transformer detecting an overload current signal of said single phase or three phase alternating current drawn by a load;

rectification means for rectifying said overload current signal detected by said current transformer;

means for amplifying said rectified overload current signal;

temperature compensation means adjacent said secondary coil of said current transformer for detecting temperature changes and compensating for errors caused by detected temperature changes;

overload display means responsive to said rectified overload current signal and being energized to display an overload current condition of said load, said overload current condition occurring when the current drawn by said load exceeds an overload current set point;

means for adjusting said overload current set point while said overload display means and load are energized to a new overload current set point exceeding the current drawn by said load so as to extinguish said overload display means;

overload relay operating means responsive to said rectified overload current signal for energizing said relay upon detection of said overload current signal, the energization of said relay eliminating the overload current condition of said load; and relay operation delay means responsive to said rectified overload current signal for delaying the operation of said overload relay operating means a predetermined amount of time after energizing of said overload display means.

2. An overload relay circuit as in claim 1, further comprising a reset circuit for resetting said relay to a position occupied during a non-overloaded state.

* * * * *